United States Patent
Ishi et al.

(10) Patent No.: US 9,101,989 B2
(45) Date of Patent: Aug. 11, 2015

(54) CUTTING INSERT, CUTTING TOOL, AND METHOD OF MANUFACTURING MACHINED PRODUCT USING THEM

(75) Inventors: Hirohisa Ishi, Moriyama (JP); Kayo Yoshida, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 209 days.

(21) Appl. No.: 13/808,998

(22) PCT Filed: Jul. 28, 2011

(86) PCT No.: PCT/JP2011/067260
§ 371 (c)(1),
(2), (4) Date: Jan. 8, 2013

(87) PCT Pub. No.: WO2012/014977
PCT Pub. Date: Feb. 2, 2012

(65) Prior Publication Data
US 2013/0108387 A1    May 2, 2013

(30) Foreign Application Priority Data
Jul. 29, 2010  (JP) ................................. 2010-170277

(51) Int. Cl.
*B23B 5/20*  (2006.01)
*B23C 5/20*  (2006.01)
(Continued)

(52) U.S. Cl.
CPC ................. *B23C 5/205* (2013.01); *B23C 5/109* (2013.01); *B23C 5/207* (2013.01); *B23C 5/2221* (2013.01);
(Continued)

(58) Field of Classification Search
CPC .. B23C 5/20; B23C 2200/0477; B23C 5/207; B23C 5/2221; Y10T 407/1924
USPC .......... 47/113, 42, 48, 61, 102–104; 407/113–116, 61, 62, 42, 34, 35, 43; 82/1.11
See application file for complete search history.

(56) References Cited

U.S. PATENT DOCUMENTS 5,020,944 A *  6/1991  Pawlik ........................... 407/42
6,238,146 B1   5/2001  Satran et al.
(Continued)

FOREIGN PATENT DOCUMENTS

JP              3065704 U     11/1999
JP            2005-528230       9/2005
(Continued)

OTHER PUBLICATIONS

13808998_20140923_JP 2008-229744A english translation, pp. 1-13, Takahashi et al. Oct. 2, 2008.*

*Primary Examiner* — Sunil K Singh
*Assistant Examiner* — Sara Addisu
(74) *Attorney, Agent, or Firm* — Volpe and Koenig, P.C.

(57) ABSTRACT

A cutting insert having an upper surface, a lower surface, a side surface with a first side surface and a second side surface which are connected to each of the upper and lower surfaces, and are adjacent to each other is provided. The insert includes a cutting edge having a major cutting edge located along an intersection of the upper surface and the first side surface, and a minor cutting edge lying along an intersection of the first side surface and the second side surface. The first side surface includes a first constraining surface located at a middle region in a thickness direction of the first side surface, and a rake surface which is located recessed between the first constraining surface and the major cutting edge. A distance between the major cutting edge and the first constraining surface is increased toward the minor cutting edge in a side view.

17 Claims, 6 Drawing Sheets

(51) Int. Cl.
*B23C 5/10* (2006.01)
*B23C 5/22* (2006.01)

(52) U.S. Cl.
CPC ... *B23C 2200/0477* (2013.01); *B23C 2200/085* (2013.01); *B23C 2200/286* (2013.01); *B23C 2200/367* (2013.01); *B23C 2210/045* (2013.01); *B23C 2210/168* (2013.01); *Y10T 407/1906* (2015.01); *Y10T 407/22* (2015.01); *Y10T 407/235* (2015.01); *Y10T 409/303808* (2015.01)

(56) References Cited

U.S. PATENT DOCUMENTS

| | | | |
|---|---|---|---|
| 6,872,034 B2 | 3/2005 | Satran et al. | |
| 6,935,814 B2* | 8/2005 | Nagaya et al. | 407/100 |
| 7,150,215 B2* | 12/2006 | Krehel | 83/839 |
| 7,494,303 B2 | 2/2009 | Koskinen | |
| 7,494,393 B2 | 2/2009 | Walser et al. | |
| 7,901,161 B2* | 3/2011 | Jansson | 407/113 |
| 8,430,606 B2* | 4/2013 | Zettler | 407/42 |
| 8,454,277 B2* | 6/2013 | Dudzinsky et al. | 407/67 |
| 8,678,718 B2* | 3/2014 | Hecht | 407/117 |
| 8,702,353 B2* | 4/2014 | Chen et al. | 407/113 |
| 8,814,479 B2* | 8/2014 | Kaufmann | 407/102 |
| 2005/0042044 A1 | 2/2005 | Satran et al. | |
| 2005/0063792 A1 | 3/2005 | Satran | |
| 2005/0214081 A1 | 9/2005 | Satran et al. | |
| 2006/0147279 A1 | 7/2006 | Satran et al. | |
| 2007/0104546 A1 | 5/2007 | Maeta et al. | |
| 2013/0129433 A1* | 5/2013 | Matsumoto et al. | 407/51 |
| 2013/0266392 A1* | 10/2013 | Lee | 409/234 |
| 2013/0302099 A1* | 11/2013 | Choi et al. | 407/113 |

FOREIGN PATENT DOCUMENTS

| | | |
|---|---|---|
| JP | 2006-508810 | 3/2006 |
| JP | 2007-506566 | 3/2007 |
| JP | 2007-125669 | 5/2007 |
| JP | 2008-018515 | 1/2008 |
| JP | 2008-229744 | 10/2008 |
| JP | 2008229744 A * | 10/2008 |
| JP | 2010-064224 | 3/2010 |
| WO | WO 03/101655 | 12/2003 |
| WO | WO 2004/050283 | 6/2004 |
| WO | WO 2005/028149 | 3/2005 |

* cited by examiner

CUTTING INSERT, CUTTING TOOL, AND METHOD OF MANUFACTURING MACHINED PRODUCT USING THEM

TECHNICAL FIELD

The present invention relates to a cutting insert, a cutting tool, and a method of manufacturing a machined product using them.

BACKGROUND ART

As a conventional cutting insert, Japanese Unexamined Patent Publication No. 2010-64224 and U.S. Pat. No. 7,494,393 disclose configurations of interposing a breaker groove between a cutting edge and a constraining surface.

However, with these cutting inserts in which the constraining surface and the breaker groove are formed in the same surface, chips generated by the cutting edge are apt to collide with the constraining surface, thus making it difficult to ensure stable chip discharge performance. Additionally, the constraining surface is worn and thus makes it difficult to ensure constraining stability.

SUMMARY OF THE INVENTION

An object of the present invention is to provide a cutting insert and a cutting tool which are configured to reduce chips colliding with the constraining surface, and a method of manufacturing a machined product using the cutting insert and the cutting tool.

A cutting insert according to an embodiment of the present invention includes an upper surface, a lower surface, a side surface including a first side surface and a second side surface which are connected to each of the upper surface and the lower surface, and are adjacent to each other, and a cutting edge including a major cutting edge lying along an intersection of the upper surface and the first side surface, and a minor cutting edge lying along an intersection of the first side surface and the second side surface. The first side surface includes a first constraining surface located at a middle region in a thickness direction of the first side surface, and a rake surface which is located between the first constraining surface and the major cutting edge, and is recessed with respect to the first constraining surface and the major cutting edge. A distance between the major cutting edge and the first constraining surface is increased toward the minor cutting edge in a side view.

A cutting tool according to an embodiment of the present invention includes the cutting insert according to the above embodiment of the present invention, and a holder configured to attach the cutting insert thereto.

A method of manufacturing a machined product according to an embodiment of the present invention includes rotating the cutting tool according to the embodiment of the present; bringing the cutting edge of the cutting tool being rotated into contact against a workpiece; and separating the cutting tool from the workpiece.

In the cutting insert according to the embodiment of the present invention, though the first constraining surface is formed in addition to the rake surface on the inside of the major cutting edge in the first side surface, the distance between the major cutting edge and the first constraining surface is increased toward the minor cutting edge. It is therefore capable of effectively preventing chips colliding with the first constraining surface at a region of the major cutting edge which is located closer to the minor cutting edge and serves as a major portion for generating the chips, thereby making it possible to reduce the wear of the first constraining surface. Hence, even when, after a cutting process is performed using the first side surface and the corresponding cutting edge, the insert is attached to the holder by using the first constraining surface in a case where the cutting process is performed using, for example, the second side surface and the corresponding cutting edge, the constraining stability between the first constraining surface (insert) and the holder can be ensured.

PREFERRED EMBODIMENTS FOR CARRYING OUT THE INVENTION

<Cutting Insert>

A cutting insert (hereinafter referred to as "insert" in some cases) according to an embodiment of the present invention is described in details below with reference to FIGS. 1 and 2.

Figure 1:
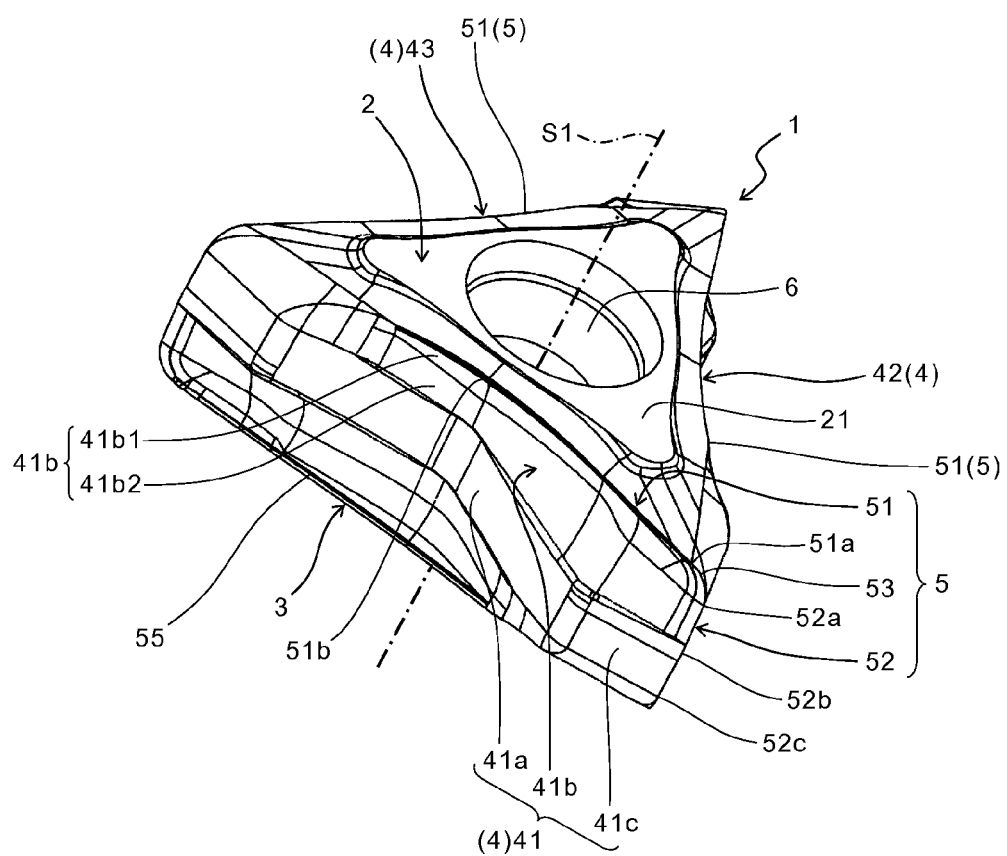
FIG. 1 is a perspective view showing a cutting insert according to an embodiment of the present invention.

As shown in FIGS. 1 and 2, the insert 1 of the present embodiment is a substantially triangle in a top view. The substantially triangular insert 1 produces two advantages that a major cutting edge 51 is disposed so as to have a relatively large positive axial rake angle, and a flank surface 41c is disposed so as to have a relatively large flank angle when the insert 1 is attached to a holder 10 as described later. The shape of the insert 1 is not limited thereto. The insert 1 may have a plate shape of a substantially polygonal shape, such as quadrangle, pentagon, hexagon, or octagon in a top view. In the following, the phrase "top view" denotes a state in which the insert 1 is viewed toward an upper surface 2 described below, unless otherwise stated.

The insert 1 of the present embodiment generally includes an upper surface 2, a lower surface 3, a through hole 6 extending between the upper surface 2 and the lower surface 3, a side surface 4 connected to each of the upper surface 2 and the lower surface 3, and a cutting edge 5 lying along the intersection of the upper surface 2 and the side surface 4. The side surface 4 includes a first side surface 41. The cutting edge 5 includes a major cutting edge 51. In the insert 1, the dimension of one side of the substantially triangle in a top view is preferably, for example, approximately 10 to 20 mm, and a thickness from the upper surface 2 to the lower surface 3 is preferably, for example, approximately 4 to 8 mm. The insert 1 can be made of a hard material, such as cemented carbide, ceramics or cermet, or, alternatively those in which a hard film of TiC, TiN, TiCN, or $Al_2O_3$ is coated on each of these base materials by means of PVD or CVD. It is preferable to use those in which PVD coating is applied to cemented carbide, from the viewpoint of chipping resistance and stability of the coating layer.

The individual elements of the insert 1 are described sequentially below. In the present embodiment, the upper surface 2 and the lower surface 3 have the same configuration, and therefore, the description of the lower surface 3 is omitted in the following unless a special explanation is required.

The upper surface 2 includes a flat surface 21 located above the major cutting edge 51 in a side view, at a portion of the upper surface 2 which is located around the through hole 6 and is away from the major cutting edge 51. In the following, the phrase "side view" denotes a state in which the insert 1 is viewed toward the first side surface 41 unless otherwise noted.

Figure 3A:
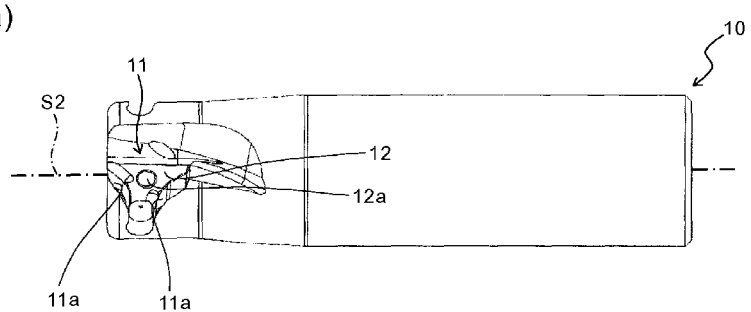
FIG. 3(a) is a side view showing a holder for attaching the cutting insert according to the embodiment of the present invention.
Figure 3B:
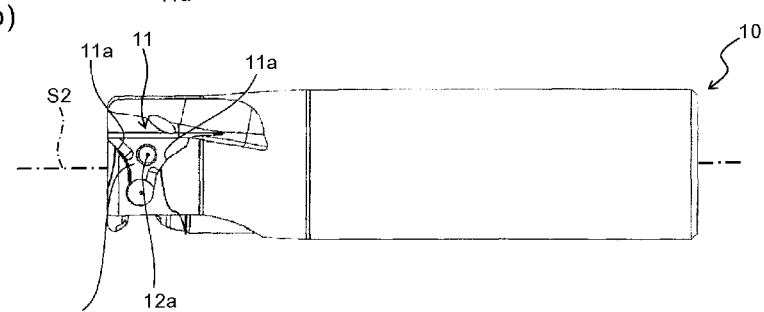
FIG. 3(b) is a side view of the holder, taken from a different angle from that in FIG. 3(a)
Figure 3C:
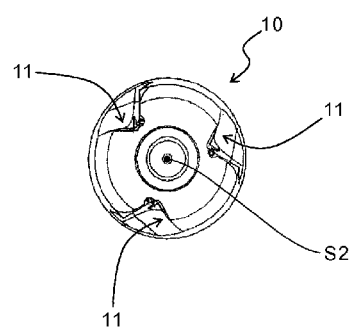
FIG. 3(c) is a front end view of the holder.

The through hole 6 is the hole for inserting a fastening screw and an attachment screw when the insert 1 is attached to the holder 10 as shown in FIG. 3. The through hole 6 is located at a middle portion of the upper surface 2. A central axis of the through hole 6 and a central axis S1 of the insert 1 are coaxially located. The central axis S1 of the insert 1 denotes the axis which extends between the upper surface 2 and the lower surface 3, and serves as a rotation axis when the insert 1 is rotated in a top view.

The side surface 4 includes a first side surface 41, a second side surface 42 and a third side surface 43 which are sequentially located adjacent to each other, as shown in FIG. 1. Of these side surfaces 41, 42 and 43, the first side surface 41 is illustrated by example below. The first side surface 41 includes a first constraining surface 41a having a function of serving as an attachment surface with respect to the holder 10, a rake surface 41b having a so-called rake function, and a flank surface 41c having a function of avoiding contact against a workpiece 100. Similarly to the first side surface 41, the second side surface 42 includes a second constraining surface 42a, a rake surface 42b and a flank surface 42c. The third side surface 43 also has the same configuration as the first side surface 41 and the second side surface 42.

Cutting edges 5 are respectively formed at peripheral edge parts of the three surfaces (the first side surface 41, the second side surface 42 and the third side surface 43) constituting the side surface 4, and the major cutting edge 51 lies along the intersections of the upper surface 2 and the side surfaces 41, 42 and 43, respectively. In the present embodiment, the first side surface 41, the second side surface 42 and the third side surface 43 have the same structure. Therefore, the following description of the first side surface 41 is common to both the second side surface 42 and the third side surface 43.

In the insert 1, the upper surface 2 and the lower surface 3 are parallel to each other, and the side surface 4 is formed substantially vertical to the upper surface 2 and the lower surface 3. Consequently, both surfaces of the insert 1 are usable for cutting process as described later. Additionally, in the insert 1, the first side surface 41, the second side surface 42 and the third side surface 43 are respectively provided with the rake surface. A major cutting edge 55 is also formed along the intersection of the lower surface 3 and the side surface 4.

Figure 2A:
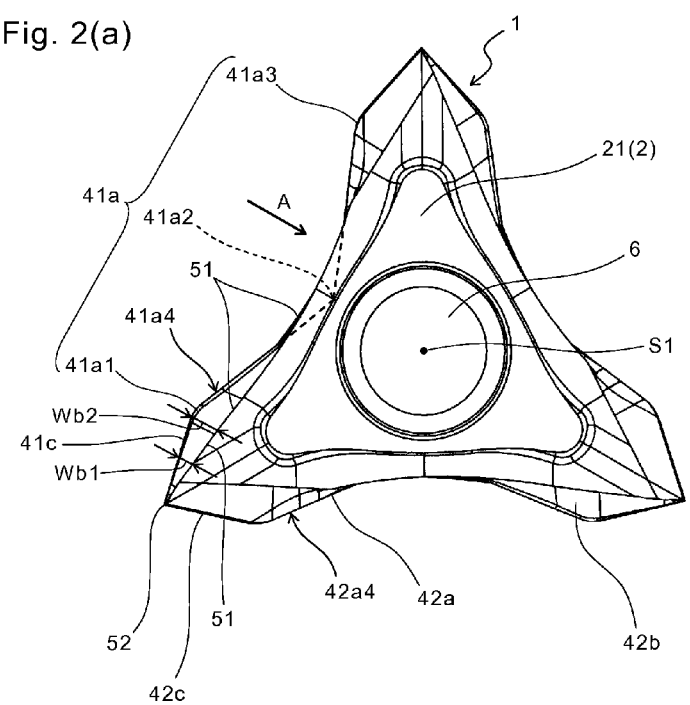
FIG. 2(a) is a plan (top) view of the cutting insert shown in FIG. 1.
Figure 2B:
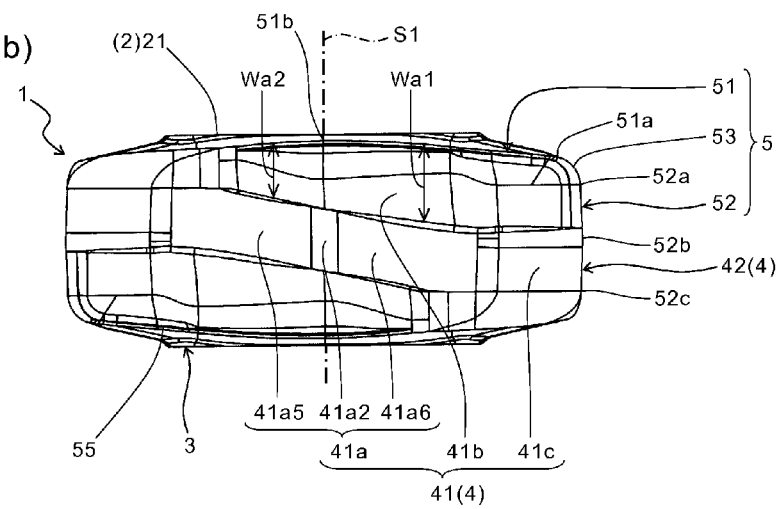
FIG. 2(b) a side view thereof, taken in a direction of arrow A in FIG. 2(a), namely, taken from a first side surface.

When the cutting process is performed using the major cutting edge 55 closer to the lower surface 3, the flat surface 21 of the upper surface 2 can be used as a seating surface with respect to the holder 10. Accordingly, the insert 1 can perform the cutting process by using a total of six corners, namely, two corners for each of the first side surface 41, the second side surface 42 and the third side surface 43. Because both surfaces of the insert 1 of the present embodiment are usable for the cutting process, the major cutting edge 55 closer to the lower surface 3 has a shape obtained by reversing the major cutting edge 51 closer to the lower surface 2 in order to allow the insert 1 to be used in a vertically reversed state. That is, as shown in FIG. 2(b), the insert 1 has a rotationally symmetrical configuration around a line perpendicular to a midpoint of the upper surface 2 and the lower surface 3 in the central axis S1.

The cutting edge 5 formed at each of the peripheral edge parts of the side surfaces 41, 42 and 43 includes the major cutting edge 51 and a minor cutting edge 52. Further in the present embodiment, as shown in FIGS. 1 and 2(b), the major cutting edge 51 and the minor cutting edge 52 are connected to each other via a corner cutting edge 53. The insert 1 of the present embodiment can perform the cutting process by using the corners including the major cutting edge 51, the minor cutting edge 52 and the corner cutting edge 53. In the present embodiment, the cutting edges 5 respectively formed at the peripheral edge parts of the side surfaces 41, 42 and 43 have the same structure. Therefore, the descriptions of the cutting edges 5 respectively formed at the peripheral edge parts of the second side surface 42 and the third side surface 43 are omitted in the following unless a special explanation is required.

The major cutting edge 51 lies along the intersection of the first side surface 41 and the upper surface 2, and performs a major role in chip generation in cutting action. In the present embodiment, the major cutting edge 51 has a curved shape that is recessed toward the through hole 6 as separating from the minor cutting edge 52 in a top view, and also has a bent shape so as to expand outward (upward) as coming from an end portion 51a to a middle portion 51b in a side view. The former structure suppresses the increase in cutting resistance during the cutting process, and the latter structure reduces the cutting edge fracture of the major cutting edge 51.

The minor cutting edge 52 lies along the intersection of the first side surface 41 and the second side surface 42. In the present embodiment, a region extending from an end portion 52a closer to the major cutting edge 51 (corner cutting edge 53) to a middle portion 52b at the intersection of the first side surface 41 and the second side surface 42 is preferably mainly used as a cutting region to be contacted against the workpiece during the cutting process. Accordingly, in the present embodiment, a region extending from the middle portion 52b to an end portion 52c opposite the corner cutting edge 53 in the intersection of the first side surface 41 and the second side surface 42 corresponds to a non-cutting region. The minor cutting edge 52 has a role in smoothing a finished surface 102 of the workpiece 100. In the present embodiment, as shown in FIG. 2(b), the minor cutting edge 52 has a V-shape inclined somewhat outward as coming from both end portions to the middle portion in a side view.

The corner cutting edge 53 is interposed between the major cutting edge 51 and the minor cutting edge 52, and has a relatively moderate curved shape, as shown in FIG. 2(b). That is, the corner cutting edge 53 is located between the major cutting edge 51 and the minor cutting edge 52, and has a curved shape projected outward in a side view. No special limitation is imposed on the radius of curvature of the corner cutting edge 53.

As described above, the side surface 4 includes the constraining surface (first constraining surface) 41a, the rake surface 41b and the flank surface 41c. In the present embodiment, the side surface 4 is made up of the three surfaces, and includes the first side surface 41 and the second side surface 42 adjacent to each other, as shown in FIG. 1. The side surface 4 is described in details below by taking the first side surface 41 as an example.

The rake surface 41b is located between the first constraining surface 41a and the major cutting edge 51, and is recessed with respect to the first constraining surface 41a and the major cutting edge 51. The rake surface 41b is the portion having a role in smoothly discharging to the exterior the chips generated by the major cutting edge 51 during the cutting process by being contacted against the chips so as to cause deformation of the chips or change their flow direction. Specifically, the rake surface 41b includes sequentially a descending portion 41b1 inclined toward the through hole 6 (inward) as coming from the major cutting edge 51 to the first constraining surface 41a, and an ascending portion (rising portion) 41b2 which is connected to the descending portion 41b1, and is inclined outward as coming to the first constraining surface 41a. Alternatively, the rake surface 41b may be configured to have a flat bottom portion between the descending portion 41b1 and the ascending portion 41b2.

The descending portion 41b1 of the rake surface 41b is inclined at a predetermined rake angle with respect to the flat surface 21, and the rake angle is preferably set at, for example, 30 to 55 degrees. The cutting resistance can be reduced by setting the rake angle at 30 degrees or more, and the cutting edge strength can be surely ensured by setting it at 55 degrees or less. Alternatively, the rake surface 41b may include a flat surface-shaped portion or curved surface-shaped portion. The concept of the flat surface-shaped includes not only a flat surface in a strict sense, but also slight irregularities and curves as long as they perform their function. This is also true for the curved surface shape.

In the present embodiment, the rake surface 41b extends not only between the first constraining surface 41a and the major cutting edge 51, but also between the flank surface 41c adjacent to the first constraining surface 41a and the major cutting edge 51. The rake angle at the end portion closer to the minor cutting edge 52 is preferably set at 20 to 30 degrees. The rake angle thereat is preferably set at a relatively small value because a relatively large impact force is exerted thereon during the cutting process. The rake angle of portions away from the minor cutting edge 52 is preferably set at 30 to 55 degrees as described above.

The first constraining surface 41a is located at a middle region of the first side surface in a thickness direction of the insert 1 (first constraining surface 41a), and has a role in fixing the insert 1 and the holder 10 by being contacted against the holder 10 when the cutting process is performed using the major cutting edge 51 lying on the surfaces of the side surface 4 other than the first side surface 41, for example, the first side surface and the third side surface 43.

In the present embodiment, as shown in FIG. 2(b), distance Wa between the major cutting edge 51 and the first constraining surface 41a is increased toward the minor cutting edge 52 in a side view. That is, Wa1 and Wa2 have a relationship of Wa1>Wa2, where Wa1 is distance Wa located closer to the minor cutting edge 52 than the central axis S1 of the insert 1, and Wa2 is distance Wa located away from the minor cutting edge 52 compared to the central axis S1 in the side view. Hence, in the insert 1 of the present embodiment, the first constraining surface 41a is formed in addition to the rake surface 41b on the inside of the major cutting edge 51 in the first side surface 41. However, by allowing the rake surface 41b having a relatively large width to deform the chips or change the chip flow direction at a region of the major cutting edge 51 which is closer to the minor cutting edge 52 and serves as a major portion for generating the chips, the chips colliding with the first constraining surface 41a can be effectively reduced, thereby reducing the wear of the first constraining surface 41a. Therefore, even when, after the cutting process is performed using the first side surface 41 and the cutting edge 5, the insert 1 is attached to the holder 10 in a case where the cutting process is performed using, for example, the second side surface 42 and the cutting edge 5, the constraining stability between the first constraining surface 41a (insert 1) and the holder 10 can be ensured.

In the present embodiment, the first constraining surface 41a has the following configuration. As shown in FIG. 2(b), a longitudinal direction of the first constraining surface 41a is inclined with respect to the major cutting edge 51 in the side view. The phrase "longitudinal direction" denotes the direction of a line connecting middle points of directions parallel to the central axis S1 in FIG. 2(b). When the line connecting these middle points is not a straight line, a straight line connecting middle points at both ends of the line is substituted therefor. As described later, it is preferable to constrain by using a portion of the first constraining surface 41a which is located closer to the outer periphery of the holder 10 in a state in which the first constraining surface 41a is attached to the holder 10. This allows excellent constraining stability to be exhibited during the cutting process.

Additionally, as shown in FIG. 2(b), the first constraining surface 41a extends with a substantially constant width along the major cutting edge 51 in a side view. The first constraining surface 41a is also divided at its middle portion 41a2 into two portions 41a5 and 41a6 in the side view. This facilitates attachment of these divided two portions 41a5 and 41a6 to the holder 10 as independent contact portions, thereby improving the constraining stability of the insert 1. As described later, the middle portion 41a2 has such a shape that is concavely curved so as to be located closer to the through hole 6 in a top perspective view.

On the other hand, the first constraining surface 41a has the following configuration in a top perspective view (top view). That is, as shown in FIG. 2(a), when the first constraining surface 41a is viewed as a whole, the first constraining surface 41a has a configuration being recessed toward the through hole 6 as coming to the middle portion 41a2. That is, the first constraining surface 41a is so recessed as to be closer to the central axis S1 as coming to the middle portion 41a2. When the individual portions of the first constraining surface 41a are viewed, the middle portion 41a2 is located closer to the through hole 6 (central axis S1) than the major cutting edge 51 (refer to a broken line in FIG. 2(a)), and the end portion 41a1 closer to the minor cutting edge 52 is located outward compared to the major cutting edge 51. The first constraining surface 41a is so recessed toward the through hole 6 as coming from the end portion 41a1 closer to the minor cutting edge 52 to the middle portion 41a2, thus making it easier for the chips generated by the major cutting edge 51 to be discharged to the exterior without colliding with the middle portion 41a2 of the first constraining surface 41a. That is, the wear caused by the collision of the chips can also be reduced at the middle portion 41a2 of the first constraining surface 41a. Of both end portions of the first constraining surface 41a, the end portion 41a3 located opposite the end portion 41a1 is also located outward compared to the major cutting edge 51 similarly to the end portion 41a1.

As shown in FIG. 2(a), the second side surface 42 adjacent to the first side surface 41 also includes the second constraining surface 42a at a middle region in the thickness direction of the insert 1, as described above. The portion 41a4 of the first constraining surface 41a adjacent to the minor cutting edge 52 and the portion 42a4 of the second constraining surface 42a adjacent to the minor cutting edge 52 are arranged in a substantially parallel relationship in a top perspective view.

The flank surface 41c is located between the first constraining surface 41a and the minor cutting edge 52. The flank surface 41c of the first side surface 41 is located rearward in the rotation direction of the holder 10 with respect to the minor cutting edge 52 of the second side surface 42 during the cutting process using the major cutting edge 51 of the second side surface 42, and needs not to be contacted against the workpiece 100. As shown in FIG. 2(a), distance Wb between the flank surface 41c and the major cutting edge 51 is increased as separating from the minor cutting edge 52 in a top view. That is, Wb1 and Wb2 have a relationship of Wb1<Wb2, where Wb1 is distance Wb located closer to the minor cutting edge 52, and Wb2 is distance Wb located away from the minor cutting edge 52 compared to Wb1.

<Cutting Tool>

Figure 4A:
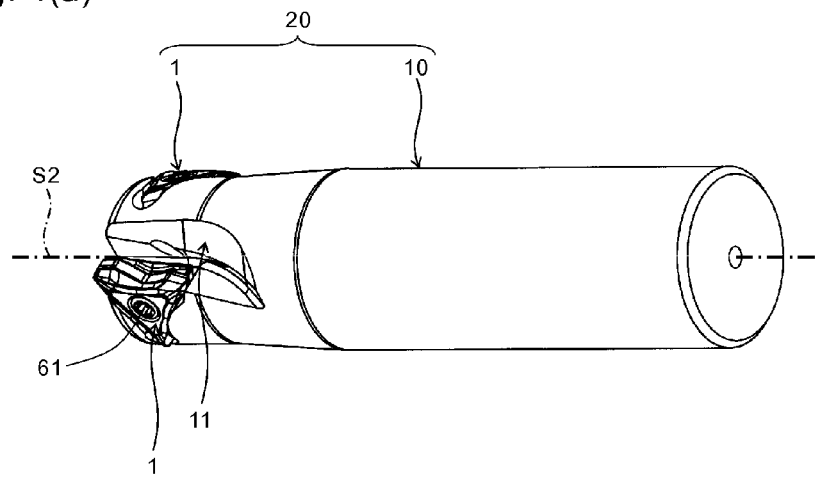
FIG. 4(a) is a perspective view showing a cutting tool according to an embodiment of the present invention.
Figure 4B:
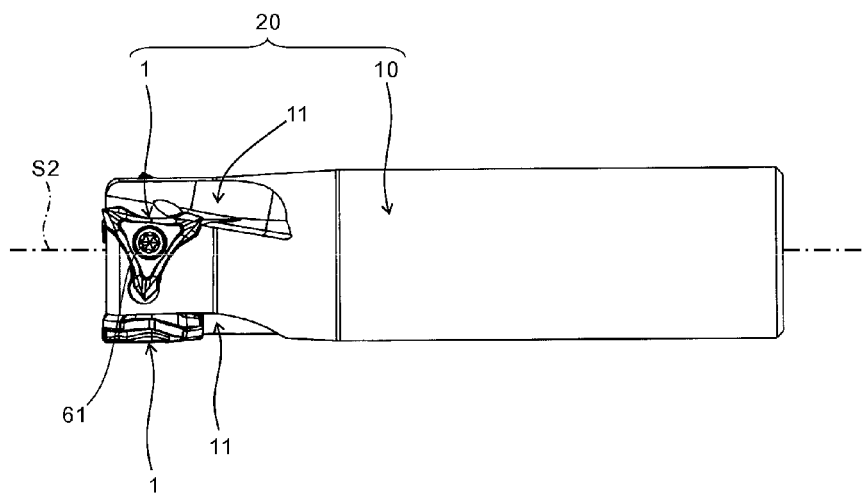
FIG. 4(b) is a side view of the cutting tool.

Next, a cutting tool according to an embodiment of the present invention is described with reference to FIGS. 3 to 5. The cutting tool 20 of the present embodiment has the foregoing plurality of inserts 1 attached to the outer peripheral front end portions of the holder 10, as shown in FIGS. 3 to 5.

Specifically, as shown in FIG. 3, a plurality of insert pockets 11 spaced apart from each other in a circumferential direction are formed in the outer peripheral front end portions of the holder 10. These insert pockets 11 correspond to the outer peripheral front end portions of the holder 10 which are cut out to form a substantially V-shape in a planar view. These insert pockets 11 have a plurality of contact surfaces 11a, and are configured to attach the inserts 1 one by one to a plurality of attachment surfaces 12 formed by the cutting out.

A method of attaching the insert 1, for example, includes inserting a fastening screw 61 into the through hole 6 of the insert 1; and screwing the front end of the fastening screw 61 into a screw hole 12a formed in the attachment surface 12 of the holder 10. As another method of attaching the insert 1, for example, a clamp structure may be employed.

Figure 5:
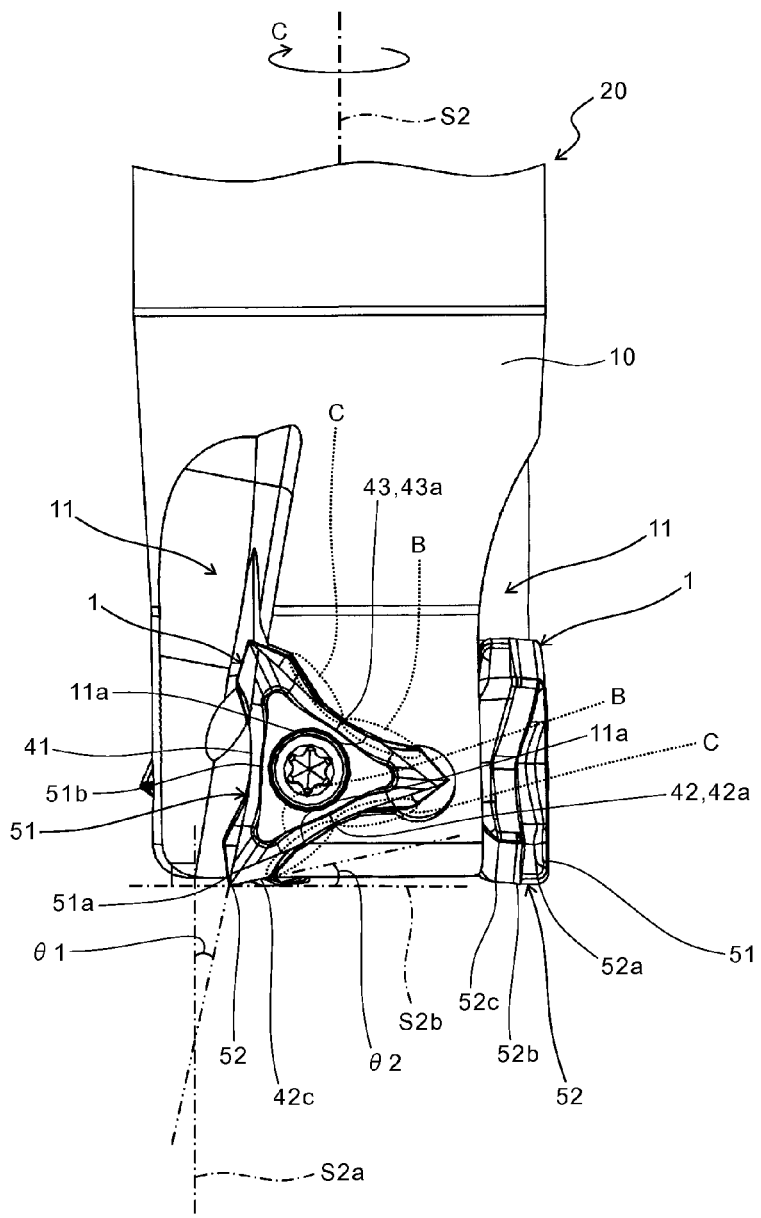
FIG. 5 is a partially enlarged view showing in enlarged dimension a front end part of the cutting tool in FIG. 4(b)

The insert 1 is attached to the holder 10 in a state in which the first side surface 41 is oriented forward in a rotation direction as indicated by an arrow C in FIG. 5, and the major cutting edge 51 is projected from the outer periphery of the holder 10. At this time, the second constraining surface 42a of the second side surface 42 and the third constraining surface 43a of the third side surface 43 in the side surface 4 of the insert 1, both of which do not contribute to cutting action, are respectively contacted against the corresponding contact surfaces 11a in the plurality of contact surfaces 11a of the holder 10. Specifically, as indicated by a region surrounded by a broken line B shown in FIG. 5, only portions of the constraining surface 42a of the second side surface 42 and the constraining surface 43a of the third side surface 43, which are located closer to the outer periphery of the holder 10 as shown in FIG. 2, are respectively contacted against the contact surfaces 11a of the holder 10, and are constrained by the holder 10, thereby allowing the insert 1 to be attached to the holder 10. Thus, the insert 1 and the holder 10 are constrained with each other by using the portions of the constraining surfaces 42a and 43a which are located closer to the outer periphery of the holder 10. This improves the constraining stability between the insert 1 and the holder 10 with respect to cutting force. For example, when the insert 1 is pushingly attached to the contact surfaces 11a of the holder 10 by allowing the axis of the through hole 6 of the insert 1 and the axis of the screw hole 12a of the holder 10 to be eccentric to each other, the floating of the insert 1 can be reduced by using the portions of the constraining surfaces 42a and 43a of the insert 1 which are located closer to the outer periphery of the holder 10. As a modification, the insert 1 may be attached to the holder 10 by using the portions of the constraining surfaces 42a and 43a of the insert 1 which are located closer to the front end of the holder 10. This improves indexing accuracy of the insert 1.

In the present embodiment, the insert 1 is disposed so that the longitudinal direction thereof has an inclination of approximately 1 to 5 degrees with respect to the rotation axis S2 of the holder 10 in a side view. Accordingly, the minor cutting edge 52 is disposed so as to have an inclination of approximately 0 to 1 degree with respect to a surface S2b vertical to the rotation axis S2 of the holder 10 (refer to FIG. 5). A non-cutting region of the intersection of the first side surface 41 and the second side surface 42 which is not substantially used for the cutting process as the minor cutting edge 52, namely, the non-cutting region extending from the middle portion 52b to the end portion 52c opposite the corner cutting edge 53 is preferably disposed so as to have an inclination of approximately 2 to 5 degrees with respect to the surface S2b vertical to the rotation axis S2 of the holder 10. Consequently, the non-cutting region is located away from the finished surface 102 of the workpiece 100, and is less susceptible to damage during the cutting process. Therefore, when the insert 1 is used by reversing the upper surface 2 and the lower surface 3, the non-cutting region can appropriately exhibit the function as the minor cutting edge 52.

Additionally, the degree of freedom of attachment to the holder 10 is improved, and excellent operation advantage based thereon are attained because the insert 1 of the present embodiment has the substantially triangular shape in a top view. That is, as shown in FIG. 5, the cutting region of the major cutting edge 51 extending from the end portion 51a of the minor cutting edge 52 to the middle portion 51b is disposed so as to have a positive axial rake angle θ1, thereby reducing the cutting resistance. Further, the flank surface 42c of the second side surface 42 located closer to the minor cutting edge 52 is disposed so as to have a flank angle θ2 of approximately 8 to 15 degrees. This makes it possible to reduce damage to the flank surface 42c, and to improve surface accuracy of the finished surface 102 of the workpiece 100. Hereat, as shown in FIG. 5, the axial rake angle θ1 means an inclination angle with respect to a surface S2a parallel to the rotation axis S2 of the holder 10, and the flank angle θ2 means an inclination angle with respect to a surface S2b vertical to the rotation axis S2 of the holder 10.

The cutting of the workpiece 100 by the major cutting edge 51 and the minor cutting edge 52 is carried out by rotating the cutting tool 20 having the foregoing configuration in a direction of arrow C around the rotation axis S2 of the holder 10.

<Method of Manufacturing Machined Product>

A method of manufacturing a machined product according to an embodiment of the present invention is described below with reference to FIG. 6.

Firstly, before starting cutting, the cutting tool 20 is prepared by attaching the plurality of cutting inserts 1 to the holder 10 in the foregoing manner. In the present embodiment, the cutting tool 20 is disposed so that the rotation axis S2 of the holder 10 is substantially parallel to a surface of the workpiece 100 which becomes a wall surface 101 by the cutting process, as shown in FIG. 6.

Figure 6A:
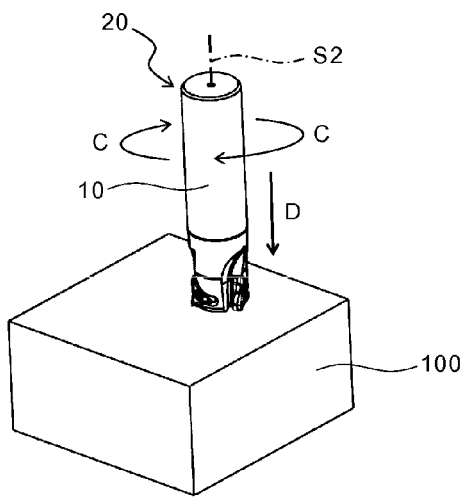
FIGS. 6(a) to 6(c) are perspective views showing a method of manufacturing a machined product according to an embodiment of the present invention in manufacturing step order.

Subsequently, as shown in FIG. 6(a), an appropriate depth of cut is set by fixing the workpiece 100 to a bed or the like of a milling machine (not shown), and by moving the cutting tool 20 in a direction of arrow D.

Figure 6B:
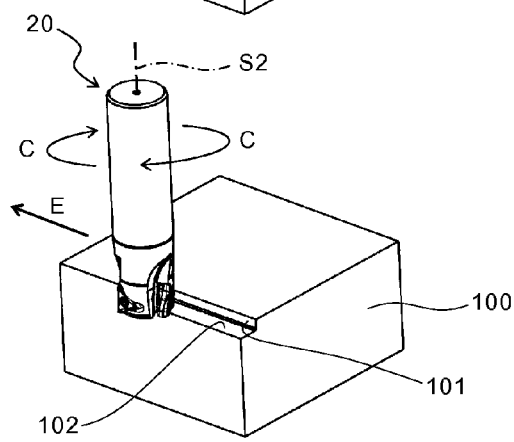

Subsequently, as shown in FIG. 6(b), the cutting tool 20 is fed (moved) in a direction of arrow E while rotating the cutting tool 20 in a direction of arrow C around the rotation axis S2 of the holder 10. Thereby, the major cutting edge 51 is contacted against an arcuate portion located ahead in the feed direction, and cuts a region according to the depth of cut. At that time, an arcuate line (cutting trace) remains on the surface of the workpiece 100 when the plurality of inserts 1 sequentially enter the cutting region for performing cutting. The arcuate line is cut by the minor cutting edge 52, thus producing a smooth surface.

In the above step, though the first constraining surface 41a is formed in addition to the rake surface 41b on the inside of the major cutting edge 51 in the first side surface 41 of the insert 1, it is capable of effectively preventing chips from colliding with the first constraining surface 41a at the region of the major cutting edge 51 which is located closer to the minor cutting edge 52 and serves as a major portion for generating chips. This makes it possible to reduce the wear of the first constraining surface 41a.

Figure 6C:
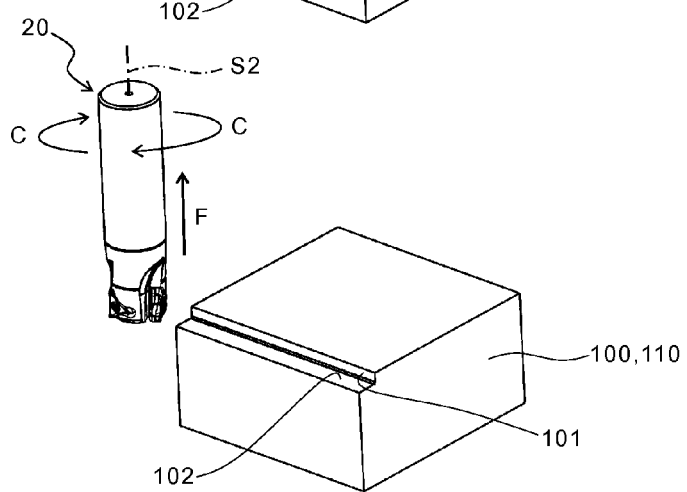

Subsequently, as shown in FIG. 6(c), the cutting tool 20 is separated from the workpiece 100 by pulling up the cutting tool in a direction of arrow F after the cutting tool 20 passes through the workpiece 100.

A machined product 110 having the wall surface 101 and a finished surface 102 is manufactured through the foregoing steps.

When the cutting process is continuously performed, it is required to repeat the foregoing steps by bringing the cutting edge 5 of the cutting tool 20 into contact against the same portion or different portions of the workpiece 100, while holding the rotation of the cutting tool 20.

When the cutting edge 5 in use is worn, the other cutting edge 5 not yet used may be used by rotating the insert 1 around the central axis S1, or by reversing the upper surface 2 and the lower surface 3. In this situation, because the wear of the first constraining surface 41a is reduced during the cutting process using the first side surface 41 and the major cutting edge 51 as described above, the constraining stability between the first constraining surface 41a (insert 1) and the holder 10 can be ensured even when the insert 1 is attached to the holder 10 by using the first constraining surface 41a in a case where the cutting process is thereafter performed using, for example, the second side surface 42.

Thus, in the method of manufacturing the machined product according to the present embodiment, the actions of cutting the workpiece 100 by bringing the individual inserts 1 into contact against the workpiece 100 while rotating the cutting tool 20, and then separating the cutting tool 20 from the workpiece 100 are repeated sequentially.

It is to be understood that the present invention is not limited to the foregoing embodiments, and various changes and modifications can be made therein without departing from the spirit or scope of the present invention.

For example, in the foregoing embodiment, the rake surface 41b is recessed over its entire length with respect to the first constraining surface 41a and the major cutting edge 51. Alternatively, the rake surface 41b may not be recessed as coming to the minor cutting edge 52.

Further, in the foregoing embodiment, the first constraining surface 41a of the insert 1 is configured to extend with the substantially constant width along the major cutting edge 51. Alternatively, the width of the first constraining surface may be decreased toward the minor cutting edge 52. Accordingly, the distance between the major cutting edge 51 and the first constraining surface 41a can be increased on the minor cutting edge 52, thereby reducing chip clogging under cutting conditions of a relatively small depth of cut.

Furthermore, in the foregoing embodiment, only the portions of the constraining surfaces 42a and 43a of the second and side surfaces 42 and 43, both of which are located closer to the outer periphery of the holder 10, are respectively contacted against the contact surface 11a, and are constrained by the holder 10, thus allowing the inserts 1 to be attached to the holder 10. Additionally, the portions of the constraining surfaces 42a and 43a of the second and third side surfaces 42 and 43, which are located closer to the inner periphery of the holder 10 as shown by the region surrounded by the broken line C in FIG. 5, may also be contacted against the contact surfaces 11a of the holder 10. This further improves the constraining stability between the insert 1 and the holder 10 with respect to the cutting force. Particularly, when the area of the individual constraining surfaces 42a and 43a is small, a remarkable effect is attainable.

In the foregoing embodiment, the cutting tool 20 is fed while being rotated. Alternatively, the cutting tool 20 may be rotated, and the workpiece 100 may be subjected to feed-travel. In another alternative, as in the case of a lathe, the workpiece 100 may be cut by bringing the cutting tool 20 not being rotated into contact against the workpiece 100 being rotated. Meanwhile the inserts 1 are usable by attaching them to the holder or chuck of various types of processing machines, such as face milling cutters, end mills and milling machines. These cases permit cutting using a large number of corners, and also produce a satisfactory machined surface in which an angle formed by the wall surface and finished surface of the workpiece is approximately 90 degrees.

The invention claimed is:

1. A cutting insert, comprising:
   an upper surface;
   a lower surface;
   a side surface which is connected to each of the upper surface and the lower surface and comprises a first side surface and a second side surface being adjacent to each other; and
   a cutting edge comprising a major cutting edge lying along an intersection of the upper surface and the first side surface, and a minor cutting edge lying along an intersection of the first side surface and the second side surface, wherein
   the first side surface comprises
      a first constraining surface located at a middle region in a thickness direction, and
      a rake surface which is located between the first constraining surface and the major cutting edge, and is recessed with respect to the first constraining surface and the major cutting edge,
   a distance between the major cutting edge and the first constraining surface increases in the direction of the minor cutting edge in a side view, and
   a longitudinal direction of the first constraining surface is inclined with respect to the major cutting edge in a side view.

2. The cutting insert according to claim 1, wherein the first constraining surface extends with a constant width along the major cutting edge in a side view.

3. The cutting insert according to claim 1, wherein an end portion of the first constraining surface closer to the minor cutting edge is located outward compared to the major cutting edge in a top view.

4. The cutting insert according to claim 1, wherein the major cutting edge is curved and expands upwards going from an end portion thereof to a middle portion thereof in a side view.

5. The cutting insert according to claim 1, wherein the cutting edge further comprises a corner cutting edge, the corner cutting edge being located between the major cutting edge and the minor cutting edge and having a curved shape projected outward in a side view.

6. The cutting insert according to claim 1, wherein the upper surface comprises a flat surface located above the major cutting edge in a side view, the flat surface being located at a portion of the upper surface which is located around a central axis that extends between the upper surface and the lower surface and is away from the major cutting edge.

7. The cutting insert according to claim 1, further comprising a through hole extending between the upper surface and the lower surface.

8. The cutting insert according to claim 1, wherein a width of the first constraining surface decreases in the direction of the minor cutting edge in a side view.

9. A cutting tool, comprising:
a cutting insert according to claim 1; and
a holder configured to attach the cutting insert thereto.

10. The cutting tool according to claim 9, wherein the cutting insert is attached to the holder, and the major cutting edge has a positive axial rake angle with respect to a rotation axis of the holder.

11. The cutting tool according to claim 9, wherein
the holder comprises an insert pocket having a plurality of contact surfaces,
the first side surface of the cutting insert is oriented forward in a rotation direction of the holder, and
the second constraining surface of the second side surface of the cutting insert is contacted against at least one of the plurality of contact surfaces.

12. The cutting tool according to claim 9, wherein
the holder comprises an insert pocket having a plurality of contact surfaces,
the side surface of the cutting insert further comprises a third side surface connected to the first side surface and the second side surface,
the first side surface of the cutting insert is oriented forward in a rotation direction of the holder, and
the second constraining surface of the second side surface and a third constraining surface of the third side surface are contacted against respective corresponding contact surfaces of the plurality of contact surfaces.

13. A method of manufacturing a machined product, comprising:
rotating a cutting tool according to claim 9;
bringing the cutting edge of the cutting tool being rotated into contact against a workpiece; and
separating the cutting tool from the workpiece.

14. A cutting insert, comprising:
an upper surface;
a lower surface;
a side surface which is connected to each of the upper surface and the lower surface and comprises a first side surface and a second side surface being adjacent to each other; and
a cutting edge comprising a major cutting edge lying along an intersection of the upper surface and the first side surface, and a minor cutting edge lying along an intersection of the first side surface and the second side surface, wherein
the first side surface comprises
a first constraining surface located at a middle region in a thickness direction, and
a rake surface which is located between the first constraining surface and the major cutting edge, and is recessed with respect to the first constraining surface and the major cutting edge,
a distance between the major cutting edge and the first constraining surface increases in the direction of the minor cutting edge in a side view, and
the first constraining surface is recessed toward a central axis extending between the upper surface and the lower surface as the first constraining surface goes to a middle portion thereof in a top perspective view.

15. A cutting insert, comprising:
an upper surface;
a lower surface;
a side surface which is connected to each of the upper surface and the lower surface and comprises a first side surface and a second side surface being adjacent to each other; and
a cutting edge comprising a major cutting edge lying along an intersection of the upper surface and the first side surface, and a minor cutting edge lying along an intersection of the first side surface and the second side surface, wherein
the first side surface comprises
a first constraining surface located at a middle region in a thickness direction, and
a rake surface which is located between the first constraining surface and the major cutting edge, and is recessed with respect to the first constraining surface and the major cutting edge,
a distance between the major cutting edge and the first constraining surface increases in the direction of the minor cutting edge in a side view, and
a middle portion of the first constraining surface is located closer to a central axis extending between the upper surface and the lower surface than the major cutting edge in a top perspective view.

16. A cutting insert, comprising:
an upper surface;
a lower surface;
a side surface which is connected to each of the upper surface and the lower surface and comprises a first side surface and a second side surface being adjacent to each other; and
a cutting edge comprising a major cutting edge lying along an intersection of the upper surface and the first side surface, and a minor cutting edge lying along an intersection of the first side surface and the second side surface, wherein
the first side surface comprises
a first constraining surface located at a middle region in a thickness direction, and
a rake surface which is located between the first constraining surface and the major cutting edge, and is recessed with respect to the first constraining surface and the major cutting edge,
a distance between the major cutting edge and the first constraining surface increases in the direction of the minor cutting edge in a side view,
the second side surface comprises a second constraining surface located at a middle region in a thickness direction of the second side surface, and
a portion of the first constraining surface adjacent to the minor cutting edge and a portion of the second constraining surface adjacent to the minor cutting edge are parallel to each other in a top perspective view.

17. A cutting insert, comprising:
an upper surface;
a lower surface;
a side surface which is connected to each of the upper surface and the lower surface and comprises a first side surface and a second side surface being adjacent to each other; and a cutting edge comprising a major cutting edge lying along an intersection of the upper surface and the first side surface, and a minor cutting edge lying along an intersection of the first side surface and the second side surface, wherein the first side surface comprises
- a first constraining surface located at a middle region in a thickness direction, and
- a rake surface which is located between the first constraining surface and the major cutting edge, and is recessed with respect to the first constraining surface and the major cutting edge, a distance between the major cutting edge and the first constraining surface increases in the direction of the minor cutting edge in a side view, the first side surface further comprises a flank surface located between the first constraining surface and the minor cutting edge, and a distance between the flank surface and the major cutting edge is increased as separating from the minor cutting edge in a top view.

* * * * *